April 23, 1968   C. C. SIMS   3,380,019

PRESSURE-GRADIENT HYDROPHONE

Filed Jan. 27, 1967

INVENTOR
CLAUDE C. SIMS

BY Melvin L. Crane  AGENT
   R. S. Sciascia   ATTORNEY

United States Patent Office 3,380,019
Patented Apr. 23, 1968

3,380,019
PRESSURE-GRADIENT HYDROPHONE
Claude C. Sims, Orlando, Fla., assignor to the United States of America as represented by the Secretary of the Navy
Filed Jan. 27, 1967, Ser. No. 612,767
1 Claim. (Cl. 340—10)

ABSTRACT OF THE DISCLOSURE

A pressure gradient hydrophone including a single flexure element which is used where measurements are made in the presence of boundaries at low frequencies, for measuring pressure gradients in near field and absorption measurements. Such a hydrophone may be used at great depths since it is suitable for operation at extreme pressures. As such, the device is applicable for generation, reception or translation of sound wave energy in water.

The invention described herein may be manufactured and used by or for the Government of the United States of America for governmental purposes without the payment of any royalties thereon or therefor.

Field of invention

The present invention relates to electroacoustic transducers and more particularly to a flexure mode pressure-gradient hydrophone operable in the audio-frequency range at great depths.

Description of prior art

Heretofore, electroacoustic transducers of various types have been made in which ceramic crystals have been used for transmitting and receiving acoustical energy. Usually the ceramic crystal is assembled within a housing as a stack of elements and protected against pressure of the water and for other reasons. Some such devices are pressure compensated by use of fluids within the housing surrounding the ceramic elements. Also, ceramic element transducers have been used in which the element is subjected to the surrounding water; however, these transducers are intended as pressure sensors and not pressure gradients.

Summary of invention

The device of the present invention comprises a ceramic flexure plate cemented to a beryllium copper diaphragm or plate which is secured to a shoulder within a cylindrical housing which is large compared to the ceramic plate. The exposed side of the ceramic plate is covered with a silicone rubber to protect the ceramic plate from the water within which it operates. Thus, it can be seen that the surrounding water will apply equal pressure on one side of the beryllium copper plate and on one side of the ceramic plate. The ceramic disk responds to the gradient of the pressure and the acoustic pressure is admitted unattenuated to the front and back of the plates.

It is therefore an object of the present invention to provide a simple, small, light weight, rugged small-pressure gradient hydrophone or transducer.

Another object is to provide a hydrophone which is operable at high pressure depths.

Still another object is to provide a hydrophone which is sensitive at high pressure depths of at least 1000 p.s.i.

Yet another object is to provide a hydrophone comprising a single ceramic element.

The nature of this invention as well as other objects and advantages thereof will be readily apparent from consideration of the following specification relating to the annexed drawing, in which:

Description of preferred embodiments

Figure 1:
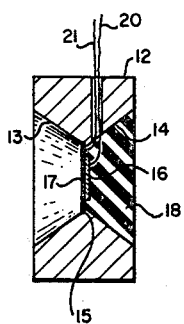
FIG. 1 illustrates a cross-sectional view of the device illustrating the relative parts.

Now referring to the drawing there is shown by illustration a pressure-gradient hydrophone comprising a cylindrical metallic body 12 of any high impedance material such as tungsten having an axial aperture therethrough formed by conical sectors 13 and 14 of different slope that almost meet at the center of the cylindrical body to form a flange 15. A ceramic flexure plate or disk 16 such as a piezoelectric material is cemented to one side of a larger diameter beryllium-copper diaphragm 17 and the beryllium-copper diaphragm is secured to the flange 15 by a suitable non-conductive cement which electrically insulates the diaphragm from the body 12. Electrical wires from any suitable outside electrical circuit are connected with one wire 20 secured to the outside of the flexure plate 16 and the other wire 21 secured to the side of the diaphragm 17 to which the flexure plate is secured. The conical area on the side of the cylindrical body in which the ceramic plate is secured is filled-in with a silicone rubber material 18 to protect the ceramic element from water.

A pressure-gradient hydrophone made in accordance with the above arrangement having a cosine radiation pattern in the entire audio-frequency range may be made as follows: The body of tungsten has a diameter of 1½ inches, a length of ¾ inch, with an axial passage of about 7⁄16 inch with a flange of about 1⁄16 inch about the axial passage. The beryllium-copper diaphragm has a diameter of about ½ inch and the ceramic flexure plate secured to the diaphragm has a diameter of about ⅜ inch.

The response of the hydrophone may be computed in terms of its pressure sensitivity on the assumption that the impedance of the mass to which the ceramic element is attached is large compared with that due to the mechanical compliance of the flexure element:

Let $e/p = M_p$, the free-field voltage sensitivity of the element as a pressure-sensing hydrophone. Then, $$e/\Delta p = M_{\Delta p}$$

the free-field voltage sensitivity of the element as a pressure-gradient sensor. So, $\Delta p/p = M_{\Delta p}/M_p$ and $$\Delta p = p\omega \Delta l (\cos \theta)/c$$

where $\Delta p$ is the acoustic pressure gradient, $p$ is the acoustic pressure, $\omega$ the angular frequency, $c$ the speed of sound, $\Delta l$ the effective path from to back of diaphragm, and $\theta$ the angle of incidence. At 0° incidence, $$M_{\Delta p} = M_p \omega \Delta l / c$$

and $$20 \log M_{\Delta p} = 20 \log M_p + 20 \log 2\pi + 20 \log \Delta l - 20 \log c + 20 \log f$$

Figure 2:
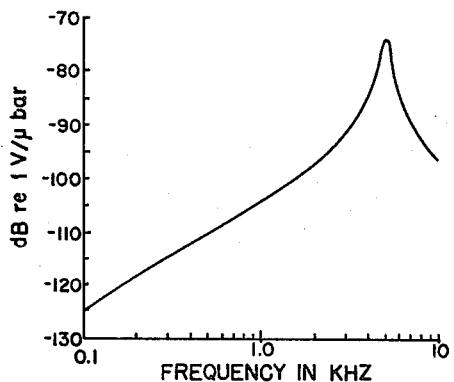
FIG. 2 illustrates the free-field voltage sensitivity of the hydrophone in the 0–1000 p.s.i.g. pressure range.

Approximate values for this hydrophone are: $\Delta l = 7$ cm.;

$$20 \log M_p = -93 \text{ db re } 1 \ V/M \text{ bar}$$

$$20 \log M_{\Delta p} = 20 \log f - 164$$

at 100 Hz., $20 \log M_{\Delta p} = -124$ db re 1 $V/M$ bar at 1 kHz., $20 \log M_{\Delta p} = -105$ db re 1 $V/\gamma$ bar The free-field voltage sensitivity curve as shown in FIG. 2 for a pressure from 0–1000 p.s.i.g. pressure illustrates that the approximations are reasonable. The directivity pattern is shown by illustration in FIG. 3.

It has been determined that both the resonant frequency and the sensitivity depend on the thickness-to-diameter ratio of the flexure element and considerable variation is possible. The illustrated hydrophone has been operated at hydrostatic pressure up to 1000 p.s.i. with no significant change in sensitivity.

Figure 3:
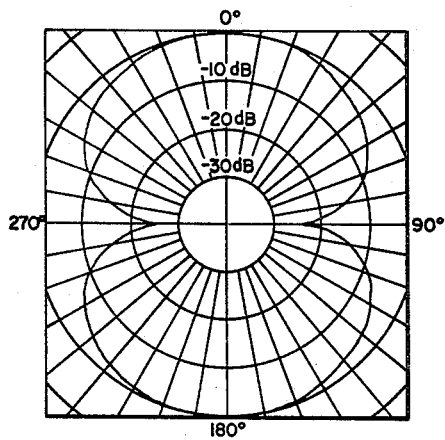
FIG. 3 illustrates a typical directivity pattern in the horizontal plane at a frequency at 4.0 kHz.

Operation of the hydrophone is as well known in the art. As a radiator, electrical currents are translated into sound waves which are directed through the water in a pattern such as shown in FIG. 3. As a receiver, sound waves incident on the diaphragm or ceramic element are translated into electric currents or electromagnetic waves.

Since the ceramic element is protected from the water and the pressure of the surrounding water is the same on one side of the ceramic element as it is on the exposed side of the diaphragm, the pressure will not have a deleterious effect on the active element. Thus, the disclosed hydrophone is a simple, rugged, small, light-weight device suitable for operation in high pressure water surrounding without harmful effects on the hydrophone device.

Obviously many modifications and variations of the present invention are possible in the light of the above teachings. It is therefore to be understood that within the scope of the appended claim the invention may be practiced otherwise than as specifically described.

What is claimed and desired to be secured by Letters Patent of the United States is:

1. In a pressure-gradient hydrophone which comprises:
   a cylindrical metallic body of high impedance material,
   an axial aperture through said cylindrical body,
   said axial aperture having the shape of opposing axially aligned conical sections with different slopes toward the mid-plane of said cylindrical body,
   a flange on the inner surface of said cylindrical body at the mid-plane thereof formed by said conical sections,
   a cylindrical metallic diaphragm secured to said flange coaxial with said body by a non-conductive element to electrically insulate said diaphragm from said metallic body,
   a ceramic disk of a piezoelectric material of lesser diameter than said diaphragm,
   said ceramic disk being secured to said metallic diaphragm with one side face to face to said metallic diaphragm in electrical contact and coaxial therewith,
   and a protective covering of rubbery material in contact with and covering the face of said disk outwardly of said metallic diaphragm to protect the ceramic element from water,
   whereby the ceramic disk is effectively surrounded by water on each side during operation.

References Cited
UNITED STATES PATENTS

| | | | |
|---|---|---|---|
| 2,430,013 | 11/1947 | Hansell | 340—10 X |
| 2,448,365 | 8/1948 | Gillespie | 340—10 X |
| 2,564,562 | 8/1951 | Chess | 340—10 X |
| 3,271,596 | 9/1966 | Brinkerhoff | 340—10 X |
| 3,281,769 | 10/1966 | Hueter | 340—10 X |
| 3,321,189 | 5/1967 | Scarpa. | |

RODNEY D. BENNETT, *Primary Examiner.*

B. L. RIBANDO, *Assistant Examiner.*